United States Patent
Sun et al.

(10) Patent No.: US 9,965,743 B2
(45) Date of Patent: May 8, 2018

(54) SESSION COLLABORATOR

(75) Inventors: Yang Sun, Buffalo Grove, IL (US);
David Ding-hua Tzau, Vernon Hills, IL (US)

(73) Assignee: CDW LLC, Vernon Hills, IL (US)

( * ) Notice: Subject to any disclaimer, the term of this patent is extended or adjusted under 35 U.S.C. 154(b) by 526 days.

(21) Appl. No.: 12/494,536

(22) Filed: Jun. 30, 2009

(65) Prior Publication Data

US 2010/0332603 A1    Dec. 30, 2010

(51) Int. Cl.
| | |
|---|---|
| *G06F 15/16* | (2006.01) |
| *G06Q 10/10* | (2012.01) |
| *G06Q 30/06* | (2012.01) |
| *H04N 7/14* | (2006.01) |

(52) U.S. Cl.
CPC ......... *G06Q 10/10* (2013.01); *G06Q 30/0601* (2013.01); *G06Q 30/0617* (2013.01); *H04N 7/141* (2013.01)

(58) Field of Classification Search
CPC ......... H04L 12/58; H04L 67/02; G06Q 30/02; G06Q 30/0601; G06Q 3/00; G06Q 30/0617; G06Q 20/0855; G06Q 30/0613; G06Q 30/0631; G06Q 30/0222; H04W 4/12; H04N 7/141
USPC .................................. 709/227–229; 705/26.1
See application file for complete search history.

(56) References Cited

U.S. PATENT DOCUMENTS

| | | | |
|---|---|---|---|
| 5,999,908 A | 12/1999 | Abelow | |
| 6,101,545 A | 8/2000 | Balcerowski et al. | |
| 6,138,120 A | 10/2000 | Gongwer et al. | |
| 6,185,541 B1* | 2/2001 | Scroggie | G06Q 20/12 |
| | | | 705/14.23 |
| 6,308,212 B1 | 10/2001 | Besaw et al. | |
| 6,445,682 B1 | 9/2002 | Weitz | |
| 6,446,113 B1 | 9/2002 | Ozzie et al. | |
| 6,567,852 B2 | 5/2003 | Besaw et al. | |
| 6,732,185 B1 | 5/2004 | Reistad | |
| 7,133,834 B1 | 11/2006 | Abelow | |
| 7,188,181 B1 | 3/2007 | Squier et al. | |
| 7,222,078 B2 | 5/2007 | Abelow | |
| 7,266,779 B2 | 9/2007 | Baek et al. | |

(Continued)

*Primary Examiner* — Chirag R Patel
(74) *Attorney, Agent, or Firm* — Marshall, Gerstein & Borun LLP; Randall G. Rueth

(57) ABSTRACT

A method and system for establishing an electronic communication channel between at least one agent of a first entity and a second entity is provided. The method includes linking the second entity to the at least one agent of the first entity when a trigger is sent by the second entity. Providing one or more software programs over the electronic communication channel to the second entity; initiating an exchange by the at least one agent of the first entity to the second entity. And sending one or more messages over the communication channel between the at least one agent from the first entity and the second entity. The system includes a database containing a link between the agent of the first entity and the second entity. The system also includes a server configured to establish an electronic communication channel between the agent of the first entity and the second entity when a trigger is sent by the second entity. The server is further configured to provide at least one software program for sharing between the agent of the first entity and the second entity over the electronic communication channel.

23 Claims, 15 Drawing Sheets

(56) References Cited

U.S. PATENT DOCUMENTS

| | | |
|---|---|---|
| 7,389,320 B2 | 6/2008 | Reistad et al. |
| 7,426,481 B1* | 9/2008 | Connors et al. ............. 705/26.5 |
| 7,542,919 B1* | 6/2009 | Mueller ............... G06Q 10/087 |
| | | 705/16 |
| 7,620,565 B2 | 11/2009 | Abelow |
| 8,468,451 B1* | 6/2013 | Rauba ..................... G06F 3/048 |
| | | 715/705 |
| 8,560,948 B2* | 10/2013 | Hu ......................... G06Q 10/06 |
| | | 715/705 |
| 2002/0072974 A1* | 6/2002 | Pugliese et al. ................ 705/14 |
| 2003/0023515 A1* | 1/2003 | Kon ................................ 705/27 |
| 2004/0215963 A1* | 10/2004 | Kaplan ........................ 713/172 |
| 2005/0010475 A1* | 1/2005 | Perkowski et al. ............. 705/14 |
| 2005/0187783 A1* | 8/2005 | Johnston et al. ................. 705/1 |
| 2005/0256732 A1 | 11/2005 | Bauer et al. |
| 2006/0112099 A1* | 5/2006 | Musgrove et al. ............... 707/7 |
| 2006/0287929 A1 | 12/2006 | Bae et al. |
| 2007/0255639 A1 | 11/2007 | Seifert |
| 2008/0091774 A1* | 4/2008 | Taylor et al. .................. 709/203 |
| 2009/0164295 A1* | 6/2009 | Sion ............... G06Q 10/063114 |
| | | 705/7.15 |

* cited by examiner

| Customer # | Ledger Entry Number | Entry Type | Status | Document Date | Total | Payment Due | Balance Due | PO Number | Purchased By |
|---|---|---|---|---|---|---|---|---|---|
| 6196761 | MKN9499 | Invoice | Closed | 11/14/2008 | $9.29 | 12/14/2008 | $0.00 | | DAVID TZAU |
| 6196761 | KMR6021 | Invoice | Closed | 5/22/2008 | $63.57 | 6/21/2008 | $0.00 | WEB | DAVID TZAU |

CDW Rep: I show that your invoice was paid and cleared May.22nd
Customer: Thank you
CDW Rep: Feel free to contact me for any further issues Accounts Payable Rep. or

*FIG. 12*

SESSION COLLABORATOR

FIELD OF THE TECHNOLOGY

The present disclosure relates generally to communications over a network, and more particularly, to web user interface sessions and sharing of session environment information.

DESCRIPTION OF THE RELATED ART

The dissemination of information within society is vital to every day life. For instance, many companies rely on the flow of data between businesses in commercial transactions. Likewise, consumers use various communication channels such as public switched telephone networks (PSTN), cellular networks, and wireless networks, etc. to communicate all types of data for personal or business uses. One example of a communication channel that is commonly used in the dissemination of information is the Internet. As such, the Internet has become a very helpful tool for engaging in commercial as well as everyday transactions. This has lead to the development of many software and internet applications used in connection with e-commerce transactions.

Conventional methods for providing information to a customer typically involved passive techniques. For example, a customer requiring information about a product traditionally had to make the initiative to search for a product and contact a representative via telephone and/or e-mail with questions. Thus, a representative in a passive system must develop a wait and see approach. In another example, a company wishing to provide new or additional information had no direct way to proactively contact individual customers. Traditional methods of relaying the information typically involved providing a new web page or adding new content on an existing page. Either technique required the customer to locate the message themselves. These techniques lacked express customer service and convenience for customers that had immediate needs. As such, it may be desirable to provide a system and a method which allows various representatives of a company to collaborate with its customers in a push mode real time environment and/or an asynchronous environment.

BRIEF DESCRIPTION OF THE DRAWINGS

The present invention is described in detail below with reference to the attached drawing figures, which are incorporated by reference herein and wherein:

FIG. 12 is a screen shot of chat sessions between one or more agents of the vendor and a customer in a bill paying environment.

DETAILED DESCRIPTION

Figure 1:
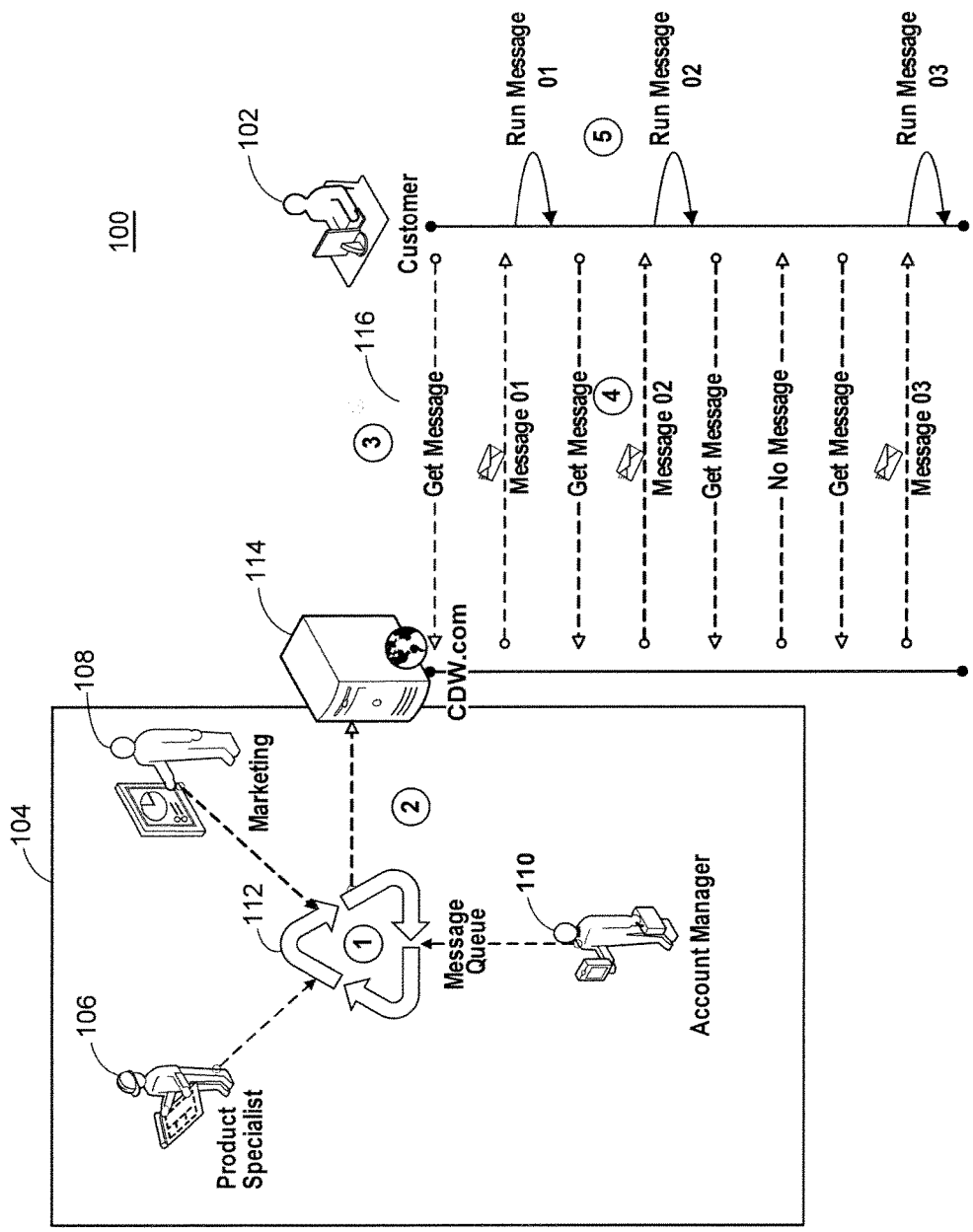
FIG. 1 is a diagram illustrating an exemplary embodiment of the invention in a real time collaboration session.

While the invention is susceptible to various modifications and alternative forms, certain embodiments are shown by way of example in the drawings and these embodiments will be described in detail herein. It should be understood, however, that this disclosure is not intended to limit the invention to the particular forms described, on the contrary, the invention is intended to cover all modifications, alternatives, and equivalents falling within the spirit and scope of the invention defined by the appended claims.

FIG. 1 illustrates a diagram of an example of the session collaboration network 100. The session collaboration network 100 may include a customer 102 and a vendor 104. The vendor 104 may include a plurality of agents 106, 108, 110. The agents 106, 108, 110 may be employees or consultants for the vendor 104 such as a product specialist 106, a marketing specialist 108 and/or an account manager 110.

The product specialist 106 may include at least one individual who is familiar with the features and other pertinent information corresponding to the products with which a customer might require assistance. The marketing specialist 108 may include at least one individual who handles the marketing of products, services, etc. for a vendor. The account manager 110 may include at least one individual who manages one or more accounts of a customer including, for example, receiving and supplying quotes, provide browsing support, and directing a customer to another agent. In order for the plurality of agents 106, 108, 110 to manage a customer's account, the agent may be linked to the customer 102 via a database (not shown) which may store a customer's connection to an agent. Alternatively, if a customer is not previously linked to an agent, one or more agents may be provided or made available to the customer. Although only three agents are listed, other agents may be used to provide customer support such as field account executives and field agents. Moreover, although the agents are described with specific functions, one agent may perform the function of other agents.

The agents 106, 108, 110 may transmit and/or receive messages via the message queue 112. The messages may be transmitted to and from the agents using conventional data transmission techniques such as polling the messages, broadcasting the messages, or any data transmission technique known by one of ordinary skill in the art. The message queue 112 may be managed by a server 114 which may allow messages to be sent and received to and from a customer 102. The server 114 may be used to connect to a customer 102 via the Internet.

The server 114 may also host a vendor website which a customer 102 may access via a personal computer (PC) running a web browser such as Internet Explorer, Firefox, Safari, etc. The customer 102 may also access a vendor website using other devices such as for example, a hand held device (e.g. PDA's, smartphones, etc.) capable of retrieving and viewing the vendor website. At the website, the customer 102 may examine the various products and services listed on the website. In turn, as shown by the message exchange 116, the agents 106, 108, 110 may proactively communicate with the customer 102 to assist with any questions and comments that the customer 102 may have as they review the products and services displayed on the website.

As shown in FIG. 1, the message exchange 16 describes a process in which the agents 106, 108, 110 of a vendor 104 communicate with a customer 102. The customer 102 may access the vendor website and while browsing, may select various tabs and options on the website. The customer 102 may also access a personalized account by, for example, providing a user name and password. In turn, the customer's activity on the website may trigger a series of messages to the server which the agents 106, 108, 110 may respond. This series of communications between the customer 102 and the agents 106, 108, 110 of the vendor 104 represent an example of a real time collaboration session. During this real time collaboration session, the PC of customer 102 may continuously ping the server 114 to check if there are any available messages. If there are any messages, these messages may be delivered, interpreted and executed on the PC of the customer 102. Although only one customer is shown, the agents may communicate with more than one customer in the same collaboration session.

Figure 2:
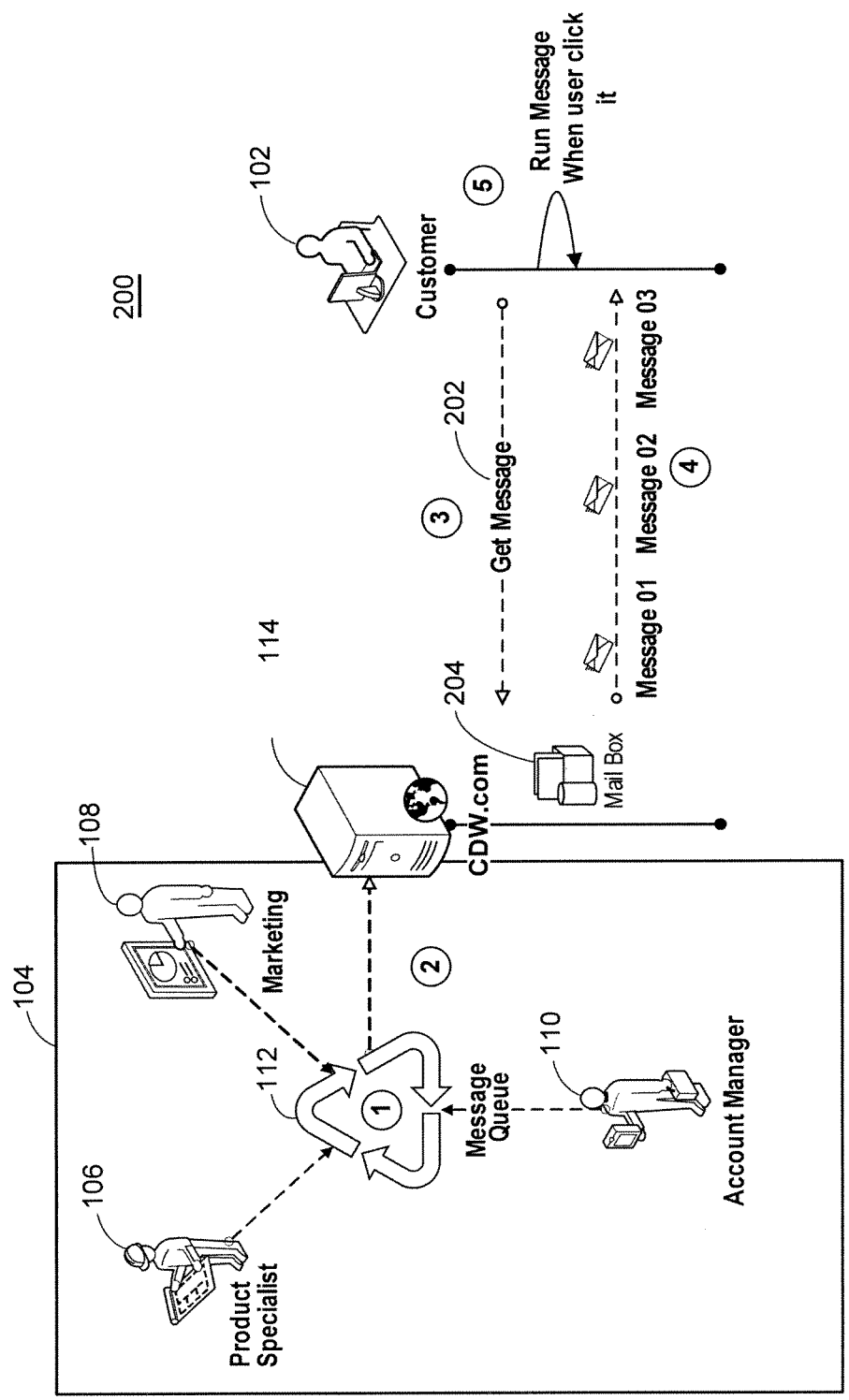
FIG. 2 is a diagram illustrating an exemplary embodiment of the invention in an asynchronous collaboration session.

FIG. 2 illustrates a diagram of an example of the session collaboration network 200 in an asynchronous environment. Similar to FIG. 1, the session collaboration network 200 may include a vendor 104 including a plurality of agents 106, 108, 110, a message queue 112, and a server 114. The server 114 maybe connected to the internet and may communicate with a customer 102 via a vendor webpage. When the customer 102 accesses the vendor webpage to examine the various products and services listed on the website a "Get Message" signal may be transmitted from the customer to the server. As shown by the message exchange 202, the agents 106, 108, 110 may communicate with the customer 102 to assist with any questions and comments that the customer 102 may have. In this example, however, the exchange may be preset and stored in a mailbox 204. That is, the agents 106, 108, 110 may have predetermined various products, promotions or anticipated questions that the customer 102 may ask. When the server 114 receives the get message signal from the customer 102, the predetermined messages from the agents 106, 108, 110 stored in the mailbox 204 may all be sent to the customer 102. Although described as a mailbox, one of ordinary skill would understand that a database or any repository of information may be used to store the preset messages and/or any other information necessary.

Figure 3:
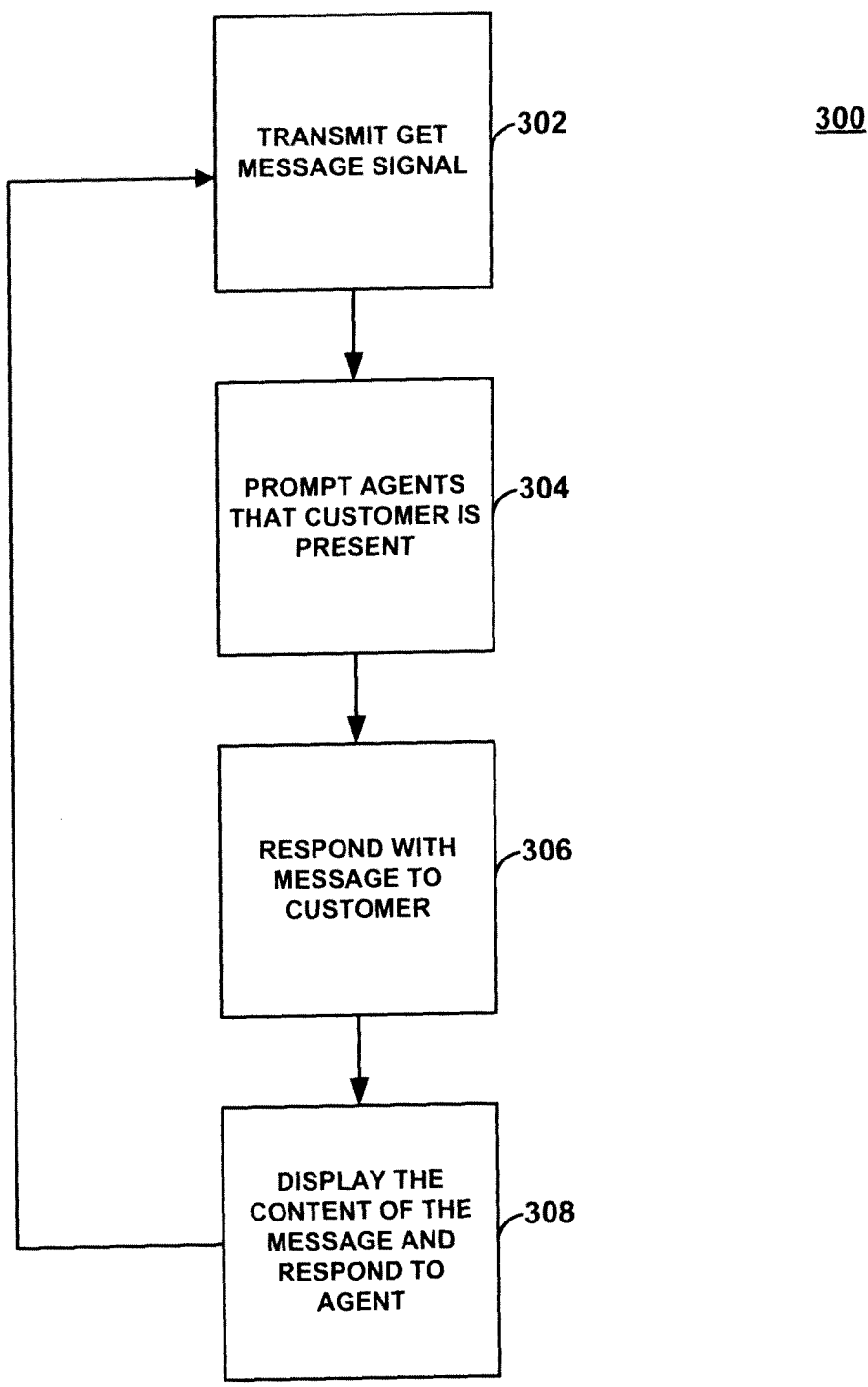
FIG. 3 is a flowchart illustrating a process for communicating messages between agents of a vendor and a customer in a real time environment.

FIG. 3 illustrates a flowchart 300 for communicating messages between agents of a vendor and a customer in a real time environment. For example, a real-time collaboration session may transmit messages in the following fashion (as shown in FIG. 1). At block 302, a "Get Message" signal is transmitted from the customer 102 to the server 114 for the agents 106, 108, 110. At block 304, this "Get Message" signal may notify the agents 106, 108, 110 that a customer 102 is present on the website and may need some assistance. At block 306, the agents 106, 108, 110 may respond with a message to the customer 102. At block 308, the content of the message may be displayed to the customer by running the message on the PC of the customer 102 and the customer 102 may choose to respond to the agent 106, 108, 110. This message indicates to the customer 102 that the agents 106, 108, 110 are available to communicate with the customer 102 and assist the customer 102 with its needs. Any type of content may be transmitted in these messages such as audio data, image data, text data, etc. FIG. 1 shows three iterations in a series of exchanges between a customer 102 and agents 106, 108, 110 of a vendor 104, however, this series of exchanges may include any number of communications necessary for the agents 106, 108, 110 of the vendor 104 to communicate with the customer 102.

Figure 4A:
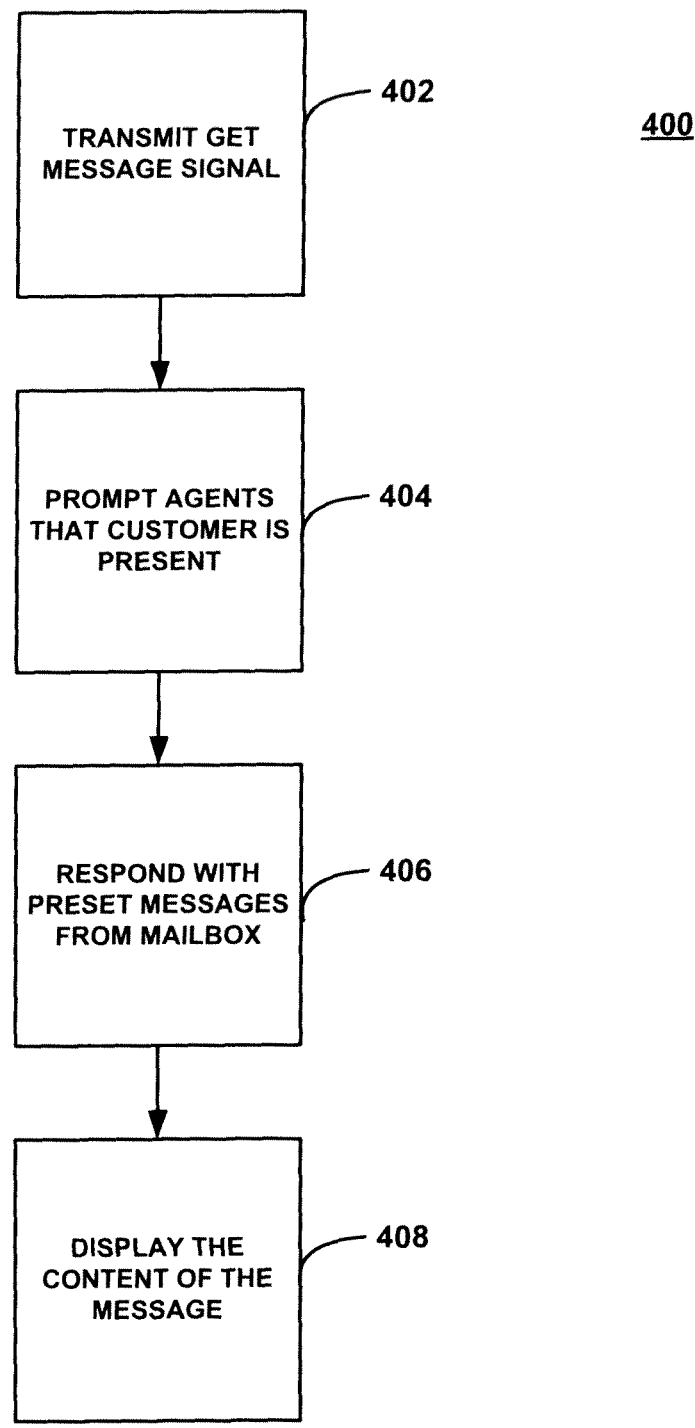
FIG. 4A is a flowchart illustrating a process for communicating messages between agents of a vendor and a customer in an asynchronous time environment.

FIG. 4A illustrates an asynchronous collaboration session, as shown in FIG. 2. At block 402, a "Get Message" signal may be transmitted from the customer 102 to the server 114. At block 404, the Get Message signal may notify the system that a customer 102 is present on the website. At block 406, a predetermined response from the agents 106, 108, 110 may be retrieved from a database such as a mailbox and sent to the customer 102. In one example, the predetermined response from the agents 106, 108, 110 may be generated based on a customer's previous browsing history or preferences previously selected and stored in a database. At block 408, the content of the messages may be displayed to the customer 102 by running the message on the customer's PC.

Figure 4B:
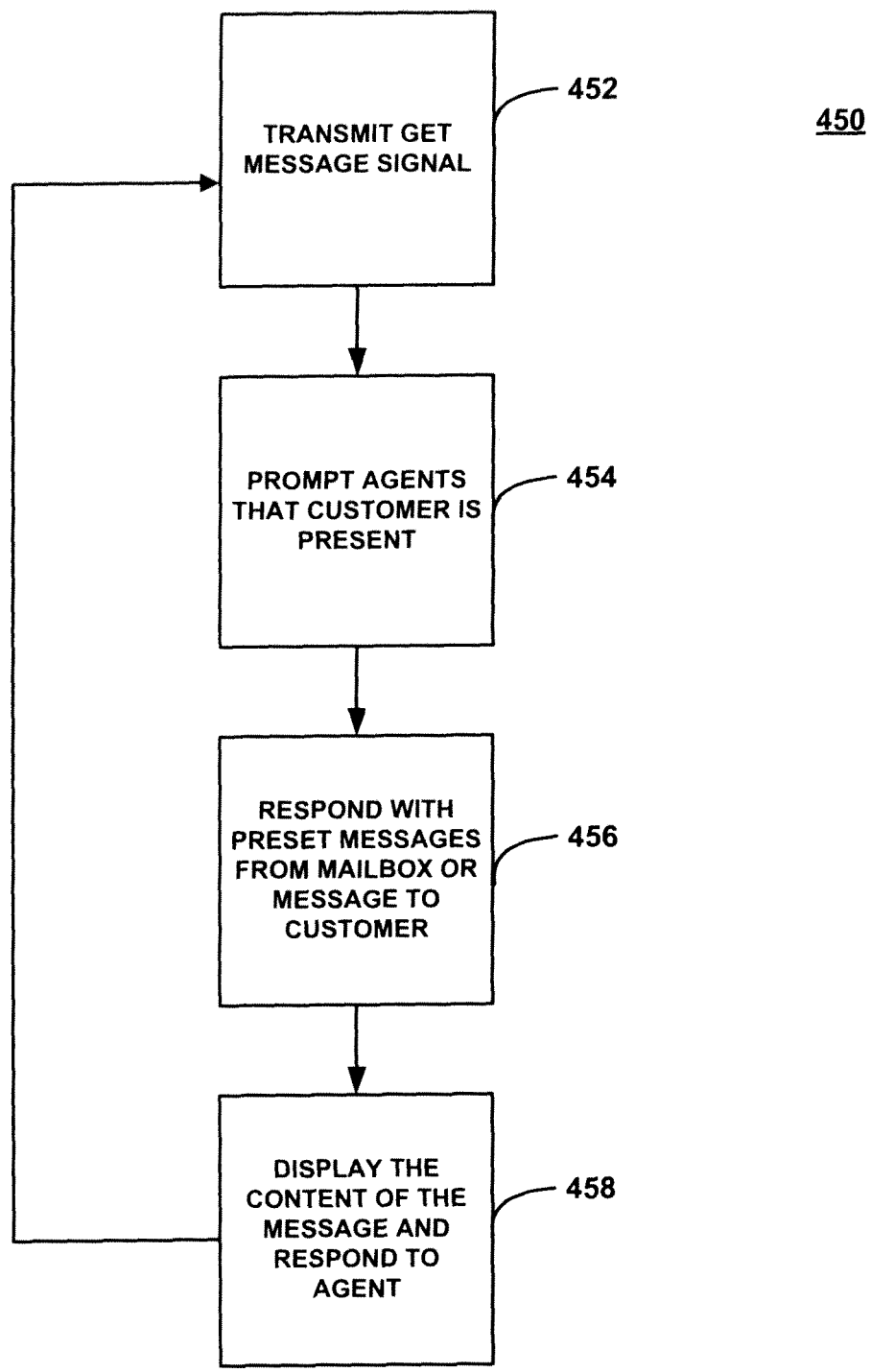
FIG. 4B is a flowchart illustrating a process for communicating messages between agents of a vendor and a customer in a combination real time and asynchronous time environment.

Alternatively, FIG. 4B illustrates a session in which a combination of an asynchronous session and a real time session is used. At block 452, a "Get Message" signal may be transmitted from the customer 102 to the server 114. At block 454, the Get Message signal may notify the system that a customer 102 is present on the website. At block 456, a predetermined response from the agents 106, 108, 110 may be retrieved from a database such as a mailbox and sent to the customer 102. At block 458, the content of the message may be displayed to the customer by running the message on the PC of the customer 102. In the case of a combination asynchronous and real time session, the agents 106, 108, 110 may then, on the next "Get Message" signal, communicate with the customer 102 in a real time collaboration session as described above. Although the combination is described with the asynchronous session first, followed by the real time session, the opposite may also be true. For example, a customer may first communicate with an agent in a real time collaboration session. The agent may then collect products to recommend to the customer based on the initial conversation, current and/or previous browsing history, or customer preferences and store the information in a mailbox to send to the customer on a subsequent "Get Message" signal.

Shared Message Queue

Referring again to FIGS. 1 and 2, at node 1, a shared message queue may be used as a message queuing tool 112 by agents 106, 108, 110 to assist customers 102. In one example, the shared message queue may include a shared message/instruction queue system which allows at least one agent 106, 108, 110 from the server side (e.g. agents of the vendor) to assist the customers 102 on the client application in a collaborative manner. For example, a customer 102 may need to build a data center which may require various products and services. As such, a product specialist may be present to answer technical and/or product specific questions that the customer 102 may have. An account manager may assist the customer 102 with pricing of the products, browsing support, etc. Each of the agents required by the customer 102 may use the shared message queue to communicate with the customer 102 and with each other. In one example, the customer 102 may communicate with more than one agent during a communication session.

Security & Authentication

At node 2 in FIGS. 1 and 2, the communication system may provide provisions for security and authentication of a message during an exchange. For example, a customer 102 may be required to log in before an agent 106, 108, 110 is able to initiate a conversation with the customer 102. Methods for providing security and authentication through log-ins are generally known in the art and will not be described further here. After a customer 102 is verified, all messages received from a customer 102 may be validated and directed to specific agents 106, 108, 110 based on a link between the customer and a specific agent stored in a database. If no link has been previously established an agent may be assigned to the customer.

Communication Channel Between Server and Client

At node 3, with reference to FIGS. 1-4B, communications between a vendor 104 via its agents 106, 108, 110 and the customer 102 may be achieved in various ways such as, for example, HTTP communication or UDP communication. Specific communication schemes are well known in the art and will not be described further. In some embodiments, the agents 106, 108, 110 of the vendor 104 may initiate a conversation with the customer in a "push mode." That is, the agents 106, 108, 110 may give direct support and recommendations to a customer 102 as opposed to a passive mode in which the customer 102 merely searches for answers on their own. As a result, a collaborative session is created.

At node 4, the message channel and delivery module described in connection with FIGS. 1-4B allows for generic messages to be initialized from the vendor 104 (at the server side) and sent to the customer 102. In some implementations, various other applications may be utilized in the system shown in FIGS. 1-4B for either a real-time session environment or an asynchronous session environment or a combination. The applications may include: search assistance in which an agent may assist a customer search for specific products or services; shopping cart assistance in which an agent may assist a customer with various shopping tools such as pricing or stocking information; navigation assistance in which an agent may assist a customer navigate through a website to specific products or services; compare assistance in which an agent may assist a customer compare one or more products or services; configuration assistance in which an agent may assist a customer in various configuration schemes such as providing information about necessary components to create a secure server; or other application that utilizes real-time or asynchronous sessions.

Message Interpretation

At node 5 with reference to FIGS. 1-4B, the customer 102 (e.g. the client) may utilize a message interpretation program for interpreting messages sent by the agents 106, 108, 110 of the vendor 104. The message interpretation programs may be in the form of an applet or software program designed to interpret one or more messages sent from the server side. The message interpretation programs may be implemented in a variety of ways. For example, the message interpretation module may be a piece of java script, silver light code, or flash code running in a client web browser, a module of code running on a television or television converter, or Digital Video Recorder (DVR); or any type of code running on a user device (e.g. personal digital assistant (PDA), smart phone and other portable and/or mobile computing device).

Alternatively, the software program may be a downloadable program that is constantly running in the background of the computing device. A customer may be prompted by the program when new information stored in a mailbox is ready to be transmitted. The downloaded program may also be initialized when a customer accesses a vendor website.

Figure 5:
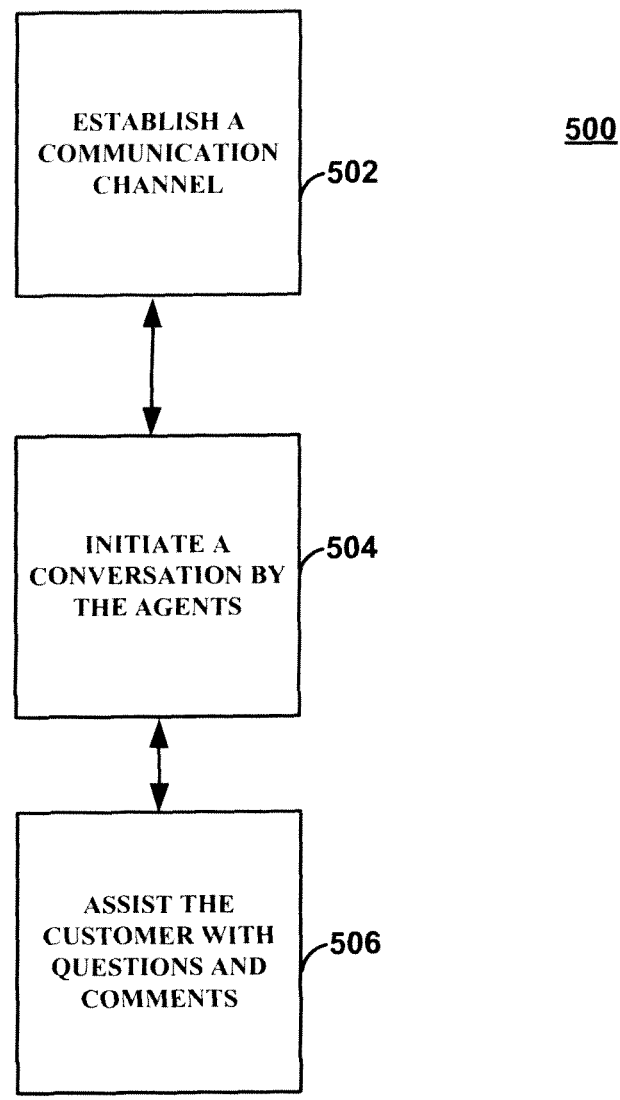
FIG. 5 is a flowchart illustrating a process in accordance with exemplary embodiments of the invention.

FIG. 5 illustrates a flowchart describing a process 500 in accordance with an exemplary embodiment of the invention. At block 502, a communication channel may be established between at least one agent 106, 108, 110 of a vendor 104 and a customer 102. At block 504, a conversation is initiated by the at least one agent 106, 108, 110 with the customer 102. At block 506, the at least one agent 106, 108, 110 may assist the customer 102 by sending messages over the communication channel as the customer 102 reviews the products and services displayed on the website of the vendor.

Figure 6:
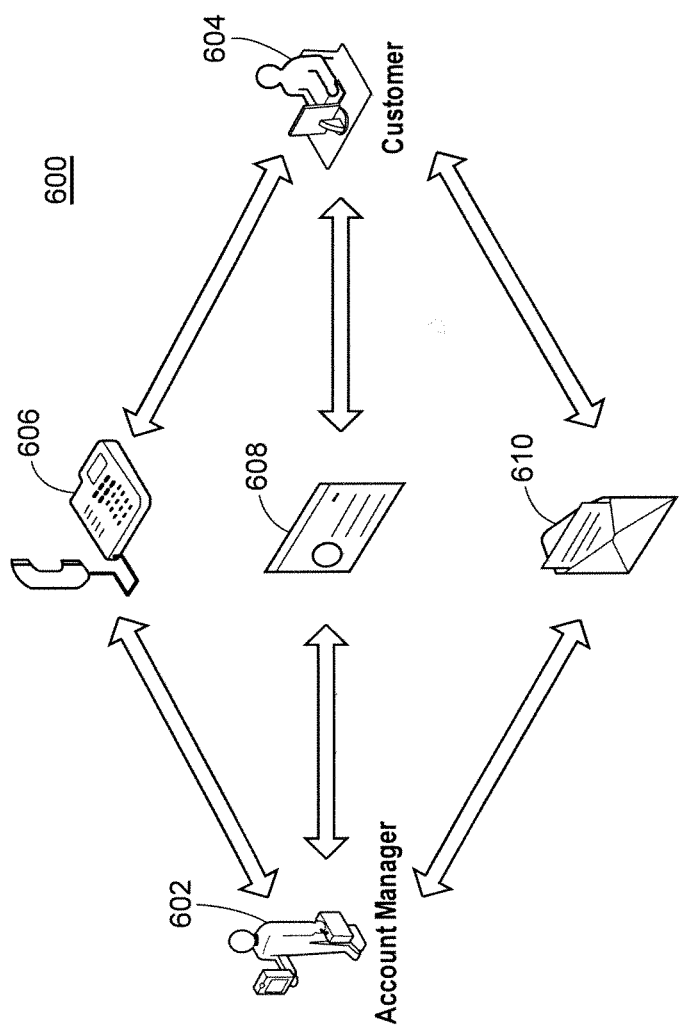
FIG. 6 is a diagram illustrating an exemplary embodiment in which an agent interacts with a customer using various mode of communications.

FIG. 6 illustrates a diagram 600 of an example of where an agent 602 such as an account manager may interact with a customer 604 using various modes of communication such as a telephone 606, a web browser 608 and an e-mail 610 in either a real time environment, an asynchronous environment or a combination as described in FIGS. 1, and 2. In some embodiments, the agent 602 may utilize a telephone 606 and/or e-mail 610 to help the customer 604 locate certain products and services on the vendor website. As a result, the agent 602 may send the customer 604 to a location on the website that the customer 604 would like to be routed. For example, the agent 602 may send the customer 604 to a specific product page on the vendor website. Alternatively, the agent 602 may send the customer 604 to a content page with an anchor to other product pages. As a further alternative, the agent 602 may present the customer 604 with a "popup" web page.

Figure 7:
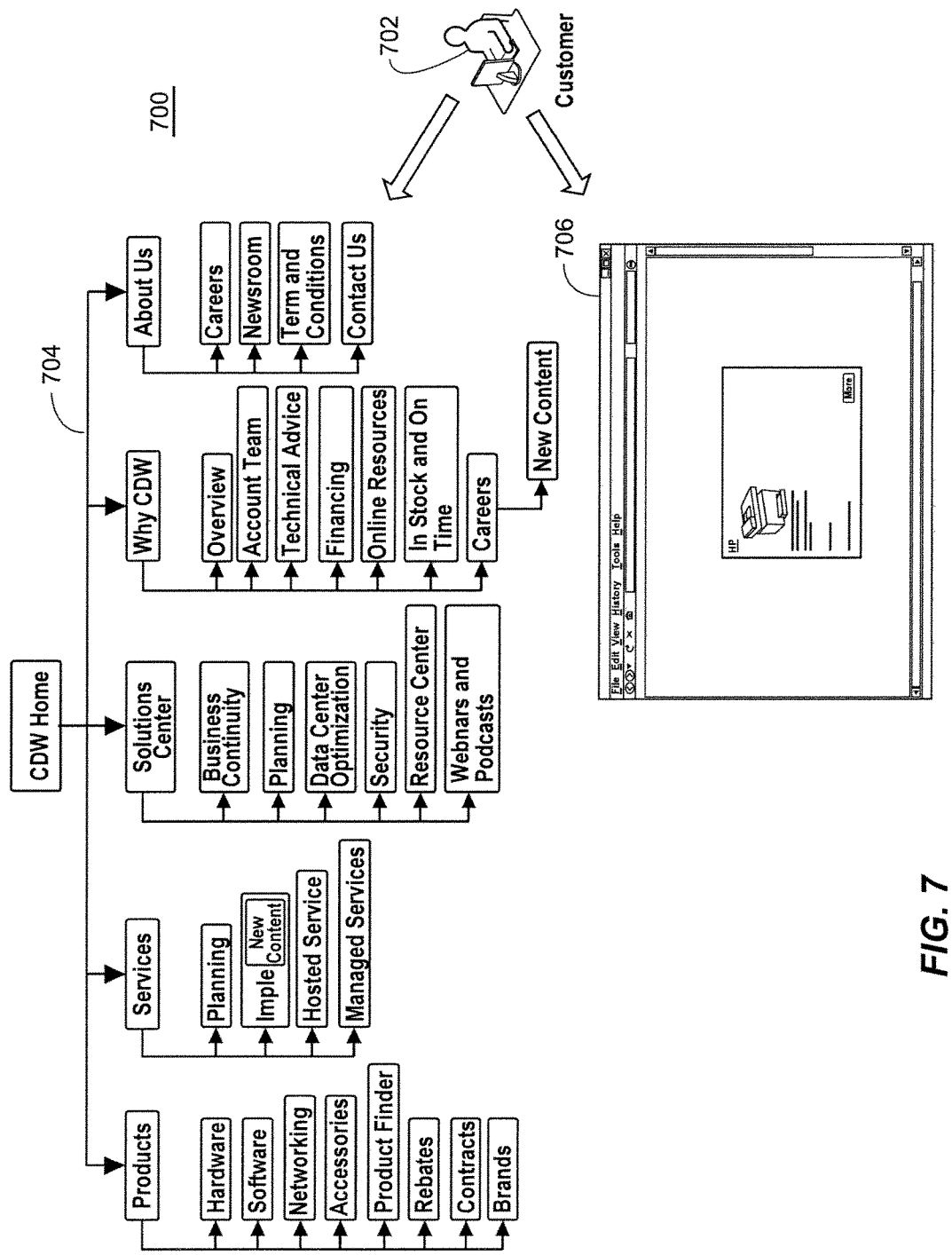
FIG. 7 is a diagram illustrating an exemplary embodiment in which a message is delivered through the web to a customer.

FIG. 7 illustrates a diagram 700 of an example where a message is delivered through the web to a customer 702 in either a real time environment or an asynchronous environment. Traditionally, a message may be presented as a new web page 704 in which a customer must navigate to within the vendor website. Instead, the message, or new product page may be pushed from the server side using an overlay 706 over a current webpage that the customer 702 is viewing. Presenting the message by overlaying the message over web page allows great flexibility in the format of the content and delivery to the target recipient. Other examples of message formats that may be utilized include a login message format, an ajax message format, and adhoc message format.

Figure 8:
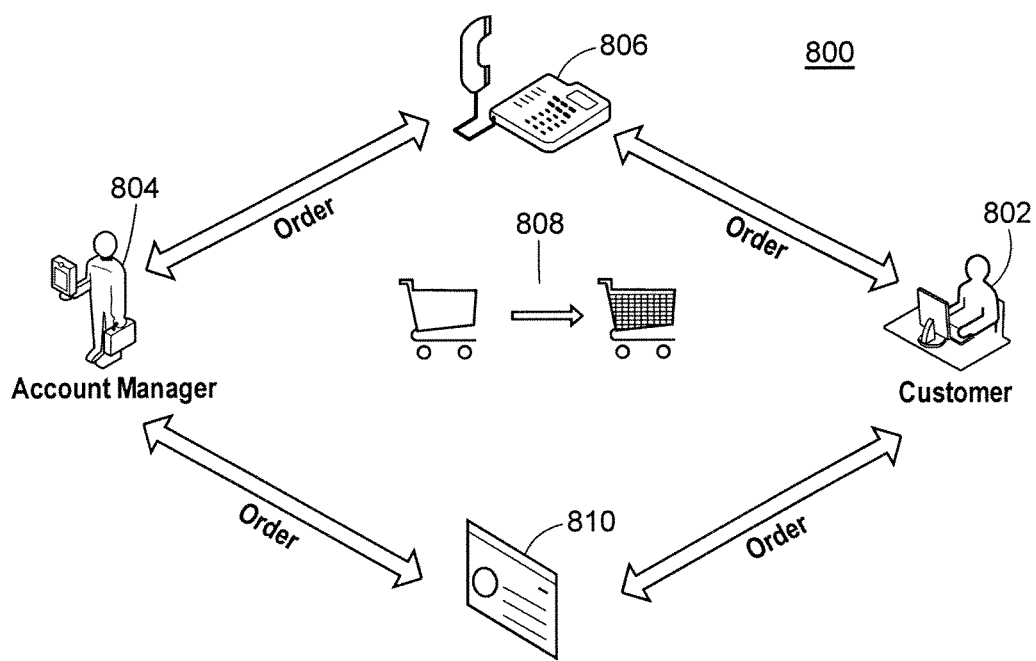
FIG. 8 is a diagram illustrating an exemplary embodiment in which the customer places an order with an agent of the vendor.

FIG. 8 illustrates a diagram 800 of an example in which the customer 802 places an order with an agent 804 of the vendor in either a real time environment or an asynchronous environment. The customer 802 may place an order for a product using a telephone 806 or using a web browser 810 (on the web page of the vendor). In response, the agent 804 such as an account manager may display the order through the web page of the vendor and allow the customer 802 to review and confirm the placed order. Thereafter, the product may be placed in a shopping cart list 808. Once in the shopping cart list 808, the customer may check if the product is available and then have the product shipped to the designated address of the customer 802.

Figure 9:
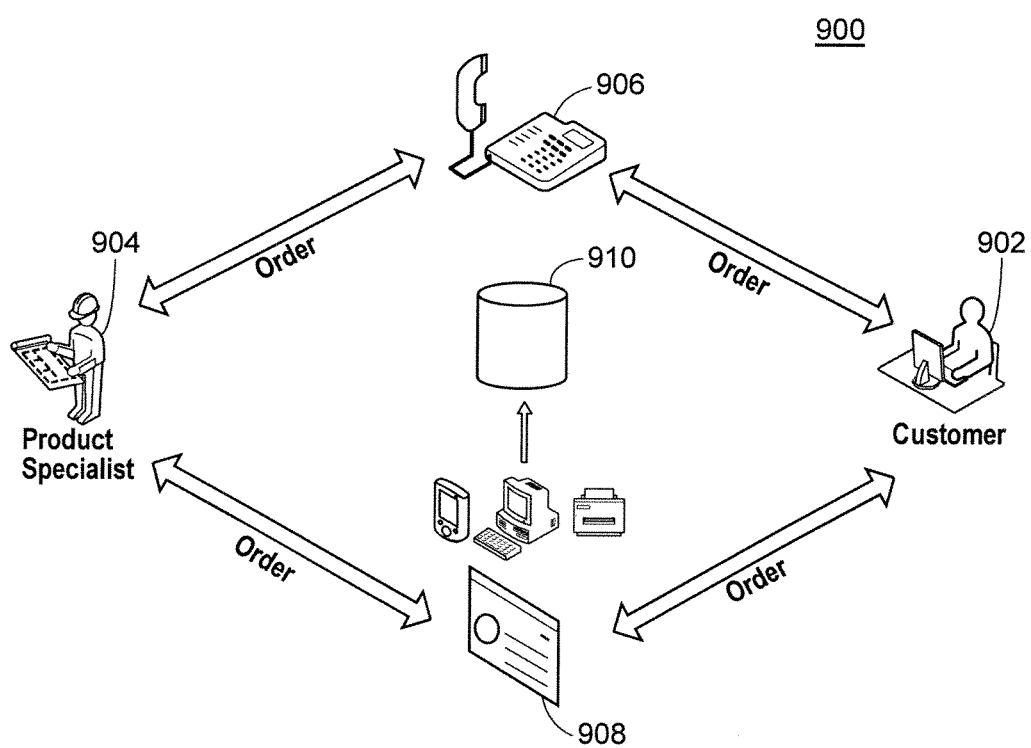
FIG. 9 is a diagram illustrating an exemplary embodiment in which a customer requests shopping assistance from an agent of the vendor.

FIG. 9 illustrates a diagram 900 of an example where the customer 902 may request shopping assistance from an agent 904 such as a product specialist in either a real time environment or an asynchronous environment. The customer 902 may review and compare various products on the vendor website. The agent 904 may provide a pre-selected set of products stored in a database 910 for the customer 902 to evaluate for purchasing. The user may add or delete a product to and from the pre-selected list before adding the items to a shopping cart. In some implementations, the preferences for a customer 902 may be determined based on the shopping habits of the customer 902 over a period of time such as one or more days, months, or years and stored in the database 910. Alternatively, the recommendation list may be generated based on the current set of products selected by the customer 902 listed in the shopping cart list.

Figure 10A:
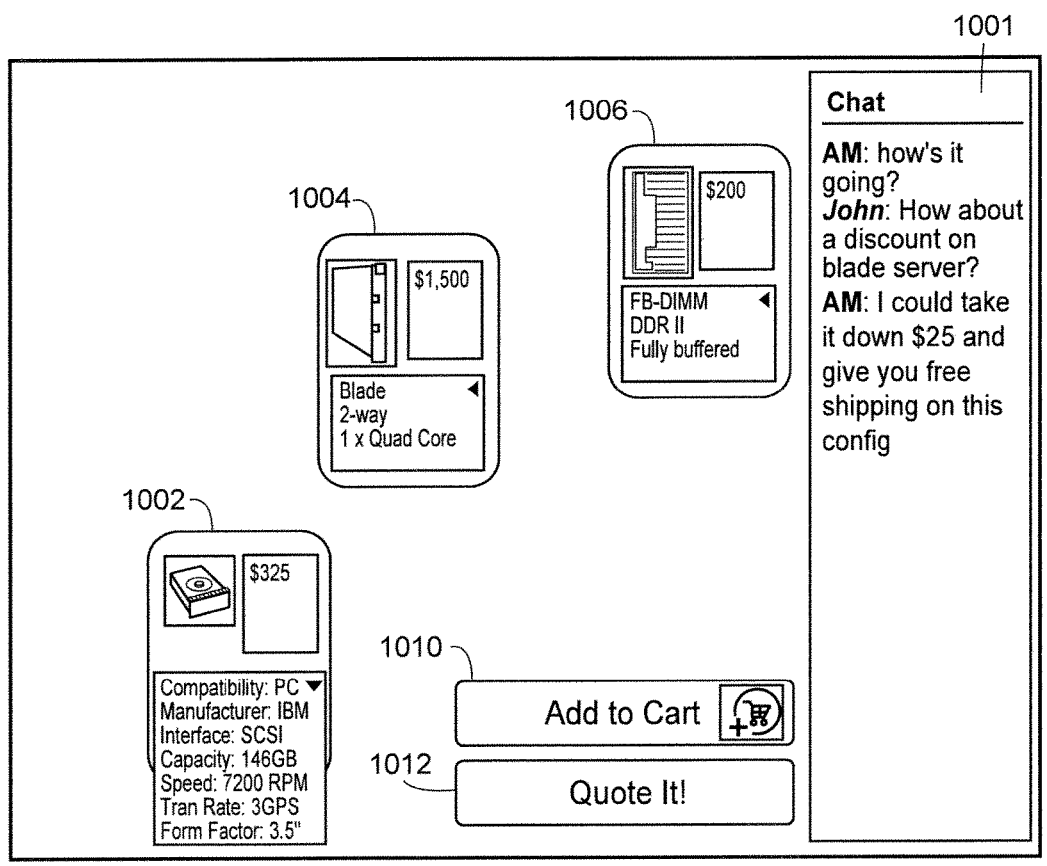
FIGS. 10A-10C are screen shots of chat sessions between one or more agents of the vendor and a customer.
Figure 10B:
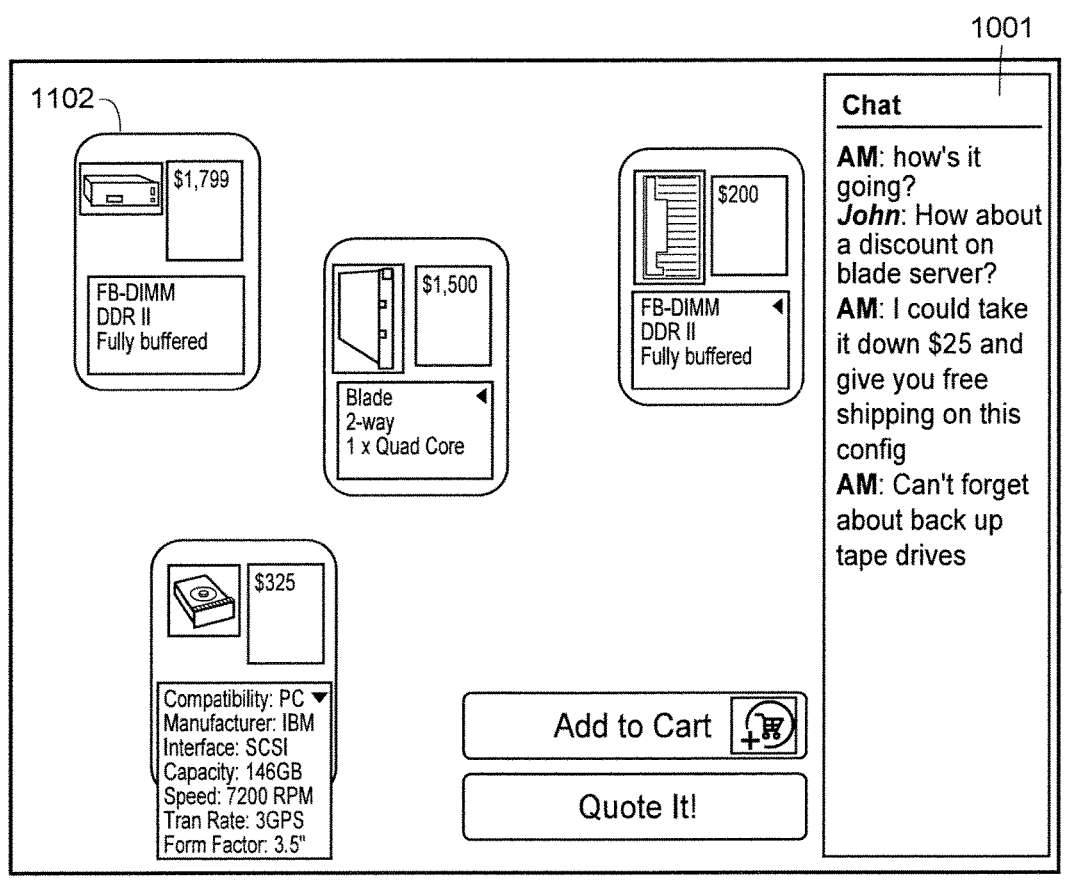
Figure 10C:
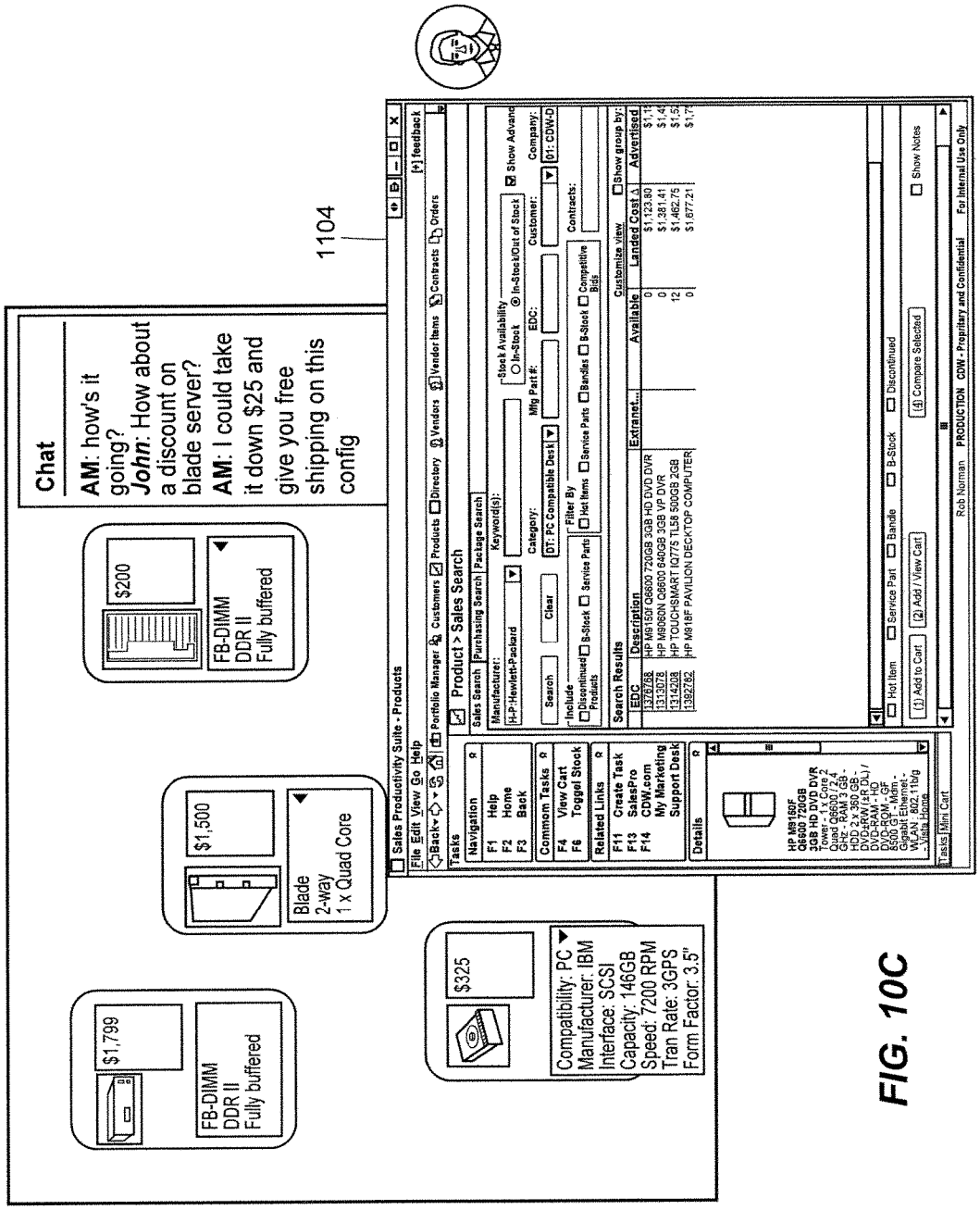

FIGS. 10A-10C provide exemplary embodiments, as a screen shot, of the graphical user interface (GUI) for facilitating conversations between agents of a vendor and a customer in a real time environment (as described in FIGS. 1 and 2). FIG. 10A shows a text window 1001 that facilitates a conversation between at least one agent of the vendor and a customer. The agent and the customer may converse using the text window in order to discuss questions related to, for example, products and pricing. FIG. 10A also shows a set of one or more selectable menu items 1002-1006 representing various products for purchase by a customer. The items may be products selected by a user during a shopping session or may be a pre-identified list presented from the agent to the customer. The customer may be able to collapse and expand attribute panels as shown in item 1002, to show additional specifications about the item. FIG. 10A also shows an add to cart menu button 1010 that places a product onto a shopping cart list. Further, FIG. 10A shows a "quote it" menu button 1012 that retrieves a price quote for a specified product by the customer.

FIG. 10B illustrates a case in which an agent may recommend additional products 1102 to the customer. In such a case, the agent may use the text window 1001 to recommend to a customer, in real time, another product for consideration. FIG. 10C shows a GUI 1104 for facilitating chat sessions between the at least one agent of the vendor and the customer. The GUI 1104 may be executed within an internal software application (e.g. Sales Productivity Suite (SPS)) of the vendor while other software applications are executing. The agent may use the GUI 1104 to search for items to recommend, remove items from a list, adjust price quotes, and provide the customer with other useful information such as the product availability.

Figure 11:
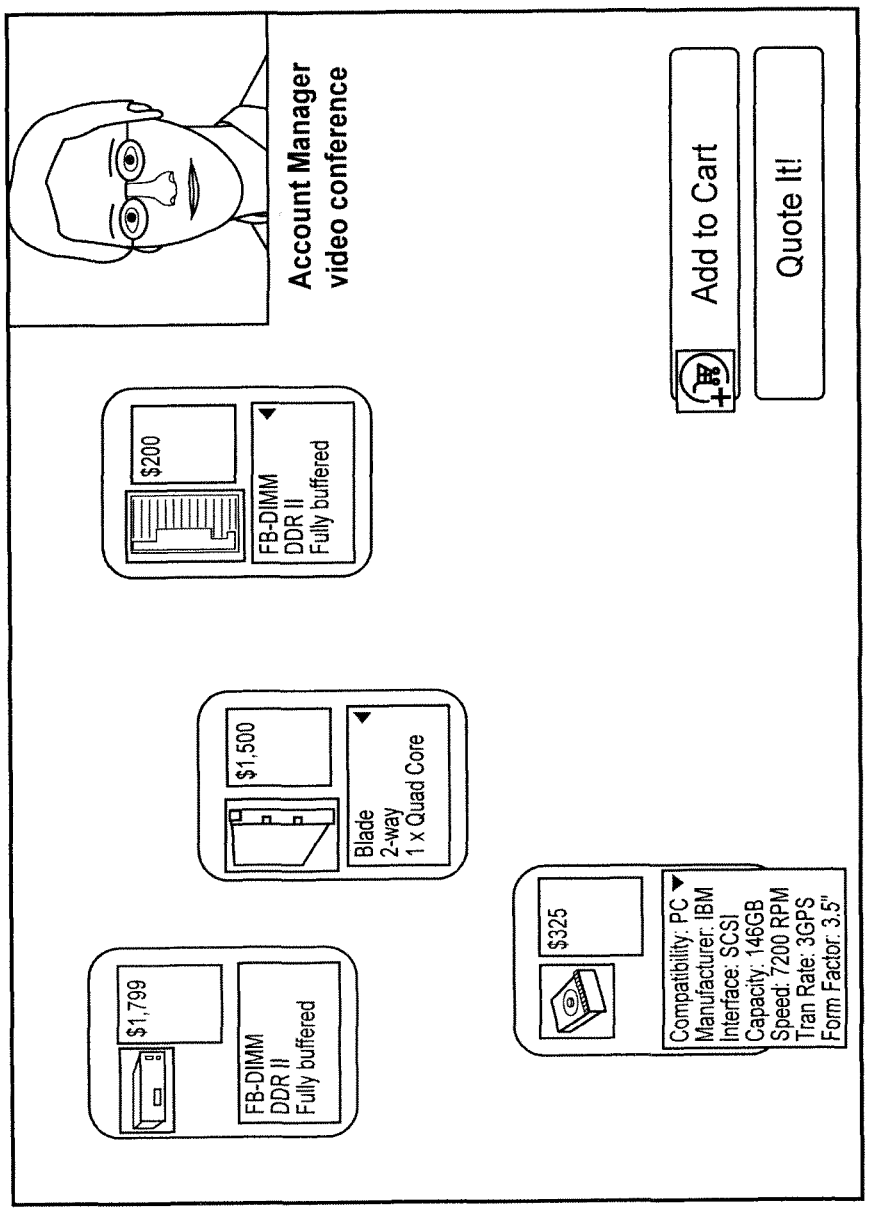
FIG. 11 is a screen shot of chat sessions between one or more agents of the vendor and a customer utilizing video conferencing.

FIG. 11 illustrates an alternative in which video conferencing is used for communication between an agent and a customer. Similar the description of FIGS. 10A-10C, an agent may interact with a customer by recommending products, adjust price quotes, and provide product information using video conferencing in place of, or in addition to a text window.

FIG. 12 illustrates another example in which a real time, asynchronous, or combination session collaborator may be used. FIG. 12 illustrates an example in which an accounts payable representative may show a customer an invoice to answer any billing questions that a customer may have.

Although the session collaboration network is described above as related to an e-commerce network, one of ordinary skill would understand that the system described may be utilized relative to a variety of other networks such as general information networks in which an agent of a vendor or otherwise a first entity may initiate a communication channel with a user or otherwise a second entity to provide information such as, for example, medical advice.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub combinations are of utility and may be employed without reference to other features and sub combinations and are contemplated within the scope of the claims. Not all steps listed in the various figures need be carried out in the specific order described.

What is claimed is:

1. A method for establishing an electronic communication channel between a plurality of agents of a first entity and a second entity comprising:
storing, in a message repository, a plurality of predetermined messages selected for communication to the second entity by the plurality of agents of the first entity, including one or more messages selected by the plurality of agents of the first entity for communication specifically to the second entity when the second entity views a web page including information associated with a product, wherein the one or more messages are selected and stored by the plurality of agents of the first entity prior to receiving an indication that the second entity is reviewing the web page, wherein the one or more messages are associated with the web page, and wherein the one or more messages are stored until the indication that the second entity is reviewing the web page is received;
linking the second entity to the plurality of agents of the first entity when a trigger is sent by the second entity, wherein the plurality of agents of the first entity includes at least two agents of the first entity performing distinct functions with respect to the first entity;
providing one or more software programs over the electronic communication channel to the second entity;
automatically initiating a message exchange regarding the product by the plurality of agents of the first entity to the second entity in response to receiving the indication that the second entity is reviewing the web page including the information associated with the product, wherein the message exchange is initiated in a push mode by causing an overlay of additional information to be presented to the second entity; and
upon receiving the indication that the second entity is reviewing the web page including the information associated with the product, automatically sending, over the communication channel between the plurality of agents from the first entity and the second entity, the one or more messages stored in the message repository as messages of the message exchange,
wherein at least one of the plurality of agents of the first entity conveys to the second entity information about a plurality of additional separate components adapted to operate as supplemental accessories to the product.

2. The method of claim 1, wherein a database is checked when linking the second entity to the plurality of agents of the first entity.

3. The method of claim 1, wherein the trigger is a login by the second entity on a website.

4. The method of claim 1, wherein the trigger is an action by the second entity detected on a website.

5. The method of claim 1, wherein a conversation between the plurality of agents of the first entity and the second entity is conducted in a real time collaboration session via the electronic communication channel.

6. The method of claim 1, wherein a conversation between the plurality of agents of the first entity and the second entity is conducted in an asynchronous collaboration session via the electronic communication channel.

7. The method of claim 1, wherein the messages include text data sent between the plurality of agents of the first entity and the second entity.

8. The method of claim 1, wherein the messages include products or services suggested by at least one of the plurality of agents of the first entity.

9. The method of claim 1, wherein at least one of the plurality of agents of the first entity directs the second entity to a second web page.

10. The method of claim 9, wherein the second webpage includes at least one of recommended products, services, accounts payable, or customer service.

11. The method of claim 1, wherein at least one of the plurality of agents of the first entity provides a pre-selected set of products or services to the second entity.

12. The method of claim 11, wherein the pre-selected set of products or services are based on the second entity's history.

13. The method of claim 1, wherein at least one of the plurality of agents of the first entity provides discounted pricing on a product or service.

14. The method of claim 1, wherein the software program is java script running on a client web browser.

15. The method of claim 1, wherein the plurality of agents of the first entity include a product specialist, a marketing specialist, and an account manager.

16. The method of claim 1, wherein the one or more messages are displayed using an overlay over a current webpage viewed by the second entity.

17. A system for establishing an electronic communication channel between a plurality of agents of a first entity and a second entity comprising:
a non-transitory computer-readable medium comprising (i) a database, wherein the database contains a link between at least one of the plurality of agents of the first entity and the second entity, wherein the plurality of agents of the first entity includes at least two agents of the first entity performing distinct functions with respect to the first entity, and (ii) a message repository storing a plurality of predetermined messages selected for communication to the second entity by the plurality of agents of the first entity, including one or more messages selected by the plurality of agents of the first entity for communication specifically to the second entity when the second entity views a web page including information associated with a product, wherein the one or more messages are selected and stored by the plurality of agents of the first entity prior to receiving an indication that the second entity is reviewing the web page, wherein the one or more messages are associated with the web page, and wherein the one or more messages are stored until the indication that the second entity is reviewing the web page is received;
a server comprising one or more processors and a memory with instructions executable by the one or more processors to configure the server to establish an electronic communication channel between the plurality of agents of the first entity and the second entity when a trigger is sent by the second entity,
wherein the server is further configured to provide at least one software program for automatically initiating a message exchange regarding the product between the plurality of agents of the first entity and the second entity over the electronic communication channel in response to receiving the indication that the second entity is reviewing the web page including the information associated with the product, wherein the message exchange is automatically initiated in a push mode by causing an overlay of additional information to be presented to the second entity over the web page upon receiving the indication that the second entity is reviewing the web page, wherein the additional information is selected from the one or more messages stored in the message repository,
wherein at least one of the plurality of agents of the first entity conveys to the second entity information about a plurality of additional separate components adapted to operate as supplemental accessories to the product.

18. The system of claim 17, wherein a conversation is initiated by at least one of the plurality of agents of the first entity when the second entity logs in to a website.

19. The system of claim 17, wherein a conversation between at least one of the plurality of agents of the first entity and the second entity is conducted in a real time collaboration session.

20. The system of claim 17, wherein a conversation between at least one of the plurality of agents of the first entity and the second entity is conducted in an asynchronous collaboration session.

21. The system of claim 17, wherein the plurality of agents of the first entity include a product specialist, a marketing specialist, and an account manager.

22. One or more non-transitory computer-readable media, having computer-usable instructions embodied thereon for performing a method by a processor comprising:
storing, in a message repository, a plurality of predetermined messages selected for communication to a customer by a plurality of agents of a vendor, including one or more messages selected by the plurality of agents of the vendor for communication specifically to the customer when the customer views a web page including information associated with a product, wherein the one or more messages are selected and stored by the plurality of agents of the vendor prior to receiving an indication that the customer is reviewing the web page, wherein the one or more messages are associated with the web page, and wherein the one or more messages are stored until the indication that the customer is reviewing the web page is received;
linking the customer to at least one of the plurality of agents of the vendor when a trigger is sent by the customer, wherein the plurality of agents of the vendor includes at least two agents of the vendor performing distinct functions with respect to the vendor;
providing one or more software programs over an electronic communication channel to the at least one of the plurality of agents of the vendor and the customer;

automatically initiating a message exchange regarding a product by the at least one of the plurality of agents of the vendor to the customer in response to receiving an indication that the customer is reviewing the web page including the information associated with the product, wherein the message exchange is initiated in a push mode by causing an overlay of additional information to be presented to the customer; and upon receiving the indication that the customer is reviewing the web page including the information associated with the product, automatically sending, over the communication channel between the plurality of agents from the vendor and the customer, the one or more messages stored in the message repository as messages of the message exchange, wherein at least one of the plurality of agents of the vendor conveys to the customer information about a plurality of additional separate components adapted to operate as supplemental accessories to the product.

23. The non-transitory computer-readable media of claim 22, wherein the one or more messages are displayed using an overlay over a current webpage viewed by the customer.

* * * * *